US012480573B2

(12) United States Patent
Yamashita et al.

(10) Patent No.: US 12,480,573 B2
(45) Date of Patent: Nov. 25, 2025

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Hirohisa Yukawa, Tokyo (JP); Masahiro Kouya, Kanagawa (JP); Tomoo Ikeda, Gunma (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,965

(22) PCT Filed: Mar. 23, 2023

(86) PCT No.: PCT/JP2023/011616
§ 371 (c)(1),
(2) Date: Sep. 13, 2024

(87) PCT Pub. No.: WO2023/182453
PCT Pub. Date: Sep. 28, 2023

(65) Prior Publication Data
US 2025/0189033 A1 Jun. 12, 2025

(30) Foreign Application Priority Data
Mar. 23, 2022 (JP) .................. 2022-047613

(51) Int. Cl.
*F16H 57/04* (2010.01)
*F16H 57/02* (2012.01)
*F16H 57/021* (2012.01)

(52) U.S. Cl.
CPC ....... *F16H 57/0435* (2013.01); *F16H 57/021* (2013.01); *F16H 57/0436* (2013.01);
(Continued)

(58) Field of Classification Search
CPC .. F16H 57/0435; F16H 57/0436; F16H 57/02; F16H 57/0424; F16H 2057/02052;
(Continued)

(56) References Cited

U.S. PATENT DOCUMENTS 5,662,188 A * 9/1997 Ito ........................... B62D 5/07
                                              184/6.12
6,752,225 B2 * 6/2004 Kojima ................ B60W 20/13
                                                477/3
(Continued)

FOREIGN PATENT DOCUMENTS

| JP | 2019-173943 A | 10/2019 |
|---|---|---|
| WO | 2006/123079 A2 | 11/2006 |
| WO | 2017/089073 A1 | 6/2017 |

*Primary Examiner* — Henry Y Liu
(74) *Attorney, Agent, or Firm* — Global IP Counselors, LLP

(57) ABSTRACT

A power transmission device includes a case that houses a power transmission mechanism, a control valve configured to control an oil pressure supplied to the power transmission mechanism, and an electric pump configured to supply oil to the control valve. The case has a first chamber that houses the power transmission mechanism, and a second chamber that is arranged adjacent to the first chamber. The control valve and the electric pump are arranged upright in the second chamber. In the case, a first recess that is recessed from above the electric pump toward the electric pump is formed in a region that overlaps the electric pump, as viewed from above along an axis of rotation of the electric pump, and a connector of the electric pump is arranged such that a connection part with a mating connector faces up in the first recess.

9 Claims, 8 Drawing Sheets

(52) U.S. Cl.
CPC .............. *F16H 2057/02034* (2013.01); *F16H 2057/02052* (2013.01); *F16H 57/0483* (2013.01); *F16H 57/0489* (2013.01); *F16H 57/0495* (2013.01)

(58) Field of Classification Search
CPC ....... F16H 2057/02034; F16H 57/0495; F16H 57/0489; F16H 57/0483; F16H 57/021; F04B 53/00
See application file for complete search history.

(56) References Cited

U.S. PATENT DOCUMENTS

| | | | | |
|---|---|---|---|---|
| 6,767,311 | B2* | 7/2004 | Yoshikawa | B60W 10/06 477/174 |
| 6,881,165 | B2* | 4/2005 | Endo | B60K 6/48 417/350 |
| 8,042,672 | B2* | 10/2011 | Grethel | F16H 61/0021 192/85.61 |
| 8,323,139 | B2* | 12/2012 | Ike | F16H 61/0025 475/159 |
| 8,403,790 | B2* | 3/2013 | Hashimoto | F16H 61/16 477/121 |
| 8,572,958 | B2* | 11/2013 | Grethel | F16H 61/0025 60/435 |
| 8,585,384 | B2* | 11/2013 | Kuroda | F04C 2/102 418/132 |
| 8,652,008 | B2* | 2/2014 | Shimizu | B60W 10/30 477/143 |
| 9,334,816 | B2* | 5/2016 | Yamanaka | F16H 61/0031 |
| 9,739,363 | B2* | 8/2017 | Schweiher | F16H 57/0457 |
| 10,138,995 | B2* | 11/2018 | Herkommer | F16H 61/0031 |
| 10,711,878 | B2* | 7/2020 | Kobayashi | F01M 11/02 |
| 11,192,551 | B2* | 12/2021 | Toen | B60W 30/18072 |
| 11,499,629 | B2* | 11/2022 | Imasato | F16H 61/662 |
| 2002/0055415 | A1* | 5/2002 | Yoshikawa | B60W 10/06 477/166 |
| 2002/0063000 | A1* | 5/2002 | Kojima | B60W 10/08 903/909 |
| 2002/0105225 | A1* | 8/2002 | Endo | F16H 61/0031 903/918 |
| 2009/0321209 | A1* | 12/2009 | Grethel | F16H 57/0473 192/70.12 |
| 2010/0151993 | A1* | 6/2010 | Ike | F16H 57/02 477/138 |
| 2011/0118072 | A1* | 5/2011 | Hashimoto | B60K 6/48 475/116 |
| 2011/0124459 | A1* | 5/2011 | Shimizu | B60W 10/30 475/137 |
| 2011/0135516 | A1* | 6/2011 | Oishi | H02K 7/14 417/410.4 |
| 2011/0229361 | A1* | 9/2011 | Kuroda | F04C 15/0026 418/166 |
| 2012/0060488 | A1* | 3/2012 | Grethel | F16H 61/0025 60/484 |
| 2014/0278000 | A1* | 9/2014 | Yamanaka | F16H 61/0031 701/102 |
| 2015/0345616 | A1* | 12/2015 | Schweiher | F16H 57/045 184/6.12 |
| 2016/0144864 | A1* | 5/2016 | Deutsch | F16H 57/0412 475/127 |
| 2016/0290482 | A1* | 10/2016 | Herkommer | F16D 25/10 |
| 2016/0290496 | A1* | 10/2016 | Tsuchida | F16H 57/0435 |
| 2017/0248065 | A1* | 8/2017 | Liu | F02B 37/00 |
| 2018/0231116 | A1* | 8/2018 | Kobayashi | F16H 7/08 |
| 2021/0129846 | A1* | 5/2021 | Toen | F16D 25/14 |
| 2021/0148459 | A1* | 5/2021 | Imasato | F16H 59/70 |

* cited by examiner

POWER TRANSMISSION DEVICE

CROSS-REFERENCE TO RELATED APPLICATIONS

This application is a U.S. national stage application of International Application No. PCT/JP2023/011616, filed on Mar. 23, 2023. This application also claims priority to Japanese Patent Application No 2022-047613, filed on Mar. 23, 2022.

BACKGROUND

Technical Field

The present invention relates to a power transmission device.

Background Information

Japanese Patent Laid-Open Publication No. 2019-173943 discloses a vehicle driving device.

SUMMARY

In the vehicle driving device of Patent Document 1, an electric oil pump is positioned at the bottom of a case with part thereof exposed to the outside of the case. In the vehicle driving device, an external connector for a power supply is provided at the top of the case. A power supply cable connecting the electric oil pump and the external connector is routed from the bottom to the top of the case.

Inside the case, components of the drive device such as rotating bodies are provided. The power supply cable must be routed while avoiding interference with these components. Therefore, the routing of the power supply cable becomes complex.

Accordingly, there is a need to simplify the routing of the power supply cable inside the case.

One aspect of the present disclosure is a power transmission device, comprising a case that houses a power transmission mechanism, a control valve that controls oil pressure supplied to a power transmission mechanism, and an electric pump that supplies oil to the control valve, wherein the case has a first chamber that houses the power transmission mechanism, and a second chamber that is arranged adjacent to the first chamber, the control valve and the electric pump are arranged upright in the second chamber, in the case, a first recess that is recessed from above the electric pump toward the electric pump is formed in a region overlapping the electric pump as viewed from above along the axis of rotation of the electric pump, and a connector of the electric pump is arranged such that a connection part with a mating connector faces up in the first recess.

According to one aspect of the present disclosure, the power supply cable can be routed more easily inside the case.

BRIEF DESCRIPTION OF THE DRAWINGS

Referring now to the attached drawings which form a part of this original disclosure.

DETAILED DESCRIPTION

Figure 1:
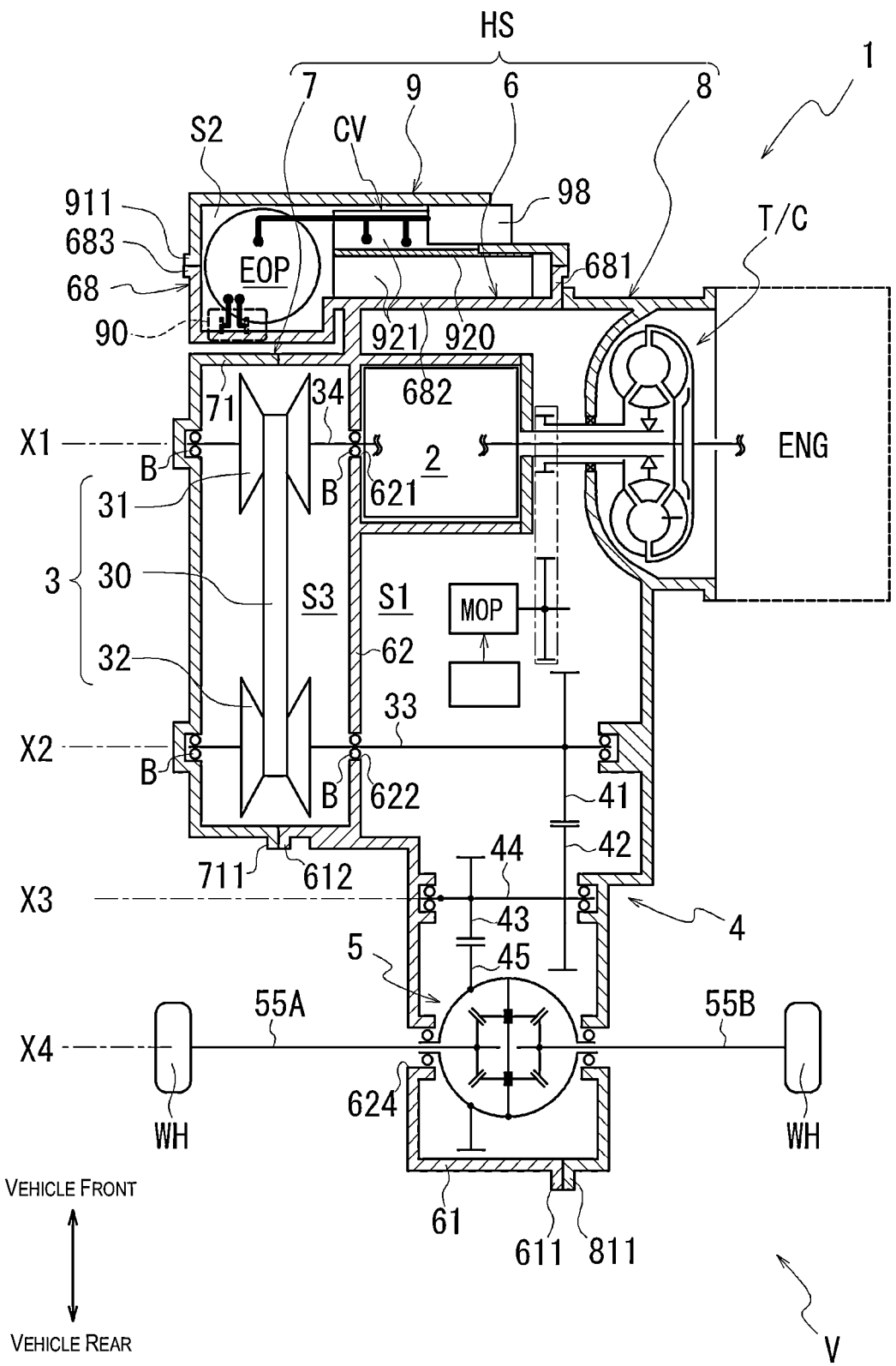
FIG. 1 is a schematic diagram illustrating a general configuration of a power transmission device.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine).

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle, etc.

If a plurality of elements (parts, sections, etc.) are shown arranged in a prescribed direction in the drawings, it may be assumed that there is text in the description in the specification indicating that the plurality of elements overlap as viewed in the prescribed direction.

"Not overlapping as viewed in a prescribed direction" and "offset as viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap as viewed in the prescribed direction.

"As viewed from a prescribed direction, a first element (part, section, etc.) is located between a second element (part, section, etc.) and a third element (part, section, etc.)" means that as viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element as viewed from the radial direction. If the first element is shown between the second element and the third element as viewed from a prescribed direction in the figures, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves (valve bodies) inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves need not be strictly arranged in a single file in the direction of the vertical line VL.

For example, if the control valve is formed by stacking multiple valve bodies, the plurality of pressure regulating valves may be arranged in the upright control valve in the direction of the vertical line VL, with the positions shifted in the stacking direction of the valve bodies.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present invention is described below.

FIG. 1 is a schematic diagram illustrating the arrangement of a power transmission device 1 in a vehicle V.

As shown in FIG. 1, the power transmission device 1 mounted in the vehicle V has a housing HS accommodating a power transmission mechanism. The housing HS comprises a case 6, a first cover 7, a second cover 8, and a third cover 9.

The interior of the housing HS accommodates a torque converter T/C, a forward-reverse switching mechanism 2, a variator 3, a reduction mechanism 4, a differential drive device 5, etc.

Inside the housing HS, an electric oil pump EOP, a mechanical oil pump MOP, and a control valve CV, etc., are houses.

In the power transmission device 1, the output rotation of an engine ENG (the drive source) is input into the forward-reverse switching mechanism 2 via the torque converter T/C. The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

In the power transmission device 1, the forward-reverse switching mechanism 2, the torque converter T/C, and the output shaft of the engine ENG are arranged coaxially (concentrically) on the axis of rotation X1 (first axis) of the primary pulley 31.

The output shaft 33 of the secondary pulley 32 and the output gear 41 are arranged coaxially on the axis of rotation X2 (second axis) of the secondary pulley 32.

The idler gear 42 and the reduction gear 43 are arranged coaxially on a common axis of rotation X3 (third axis).

The final gear 45 and the drive shafts 55A, 55B are arranged coaxially on a common axis of rotation X4 (fourth axis).

In the power transmission device 1, these axes of rotation X1-X4 are set to be in a parallel positional relationship. Hereinafter, as needed, these axes of rotation X1-X4 are collectively referred to as the axis of rotation X of the power transmission device 1 (power transmission mechanism).

Figure 2:
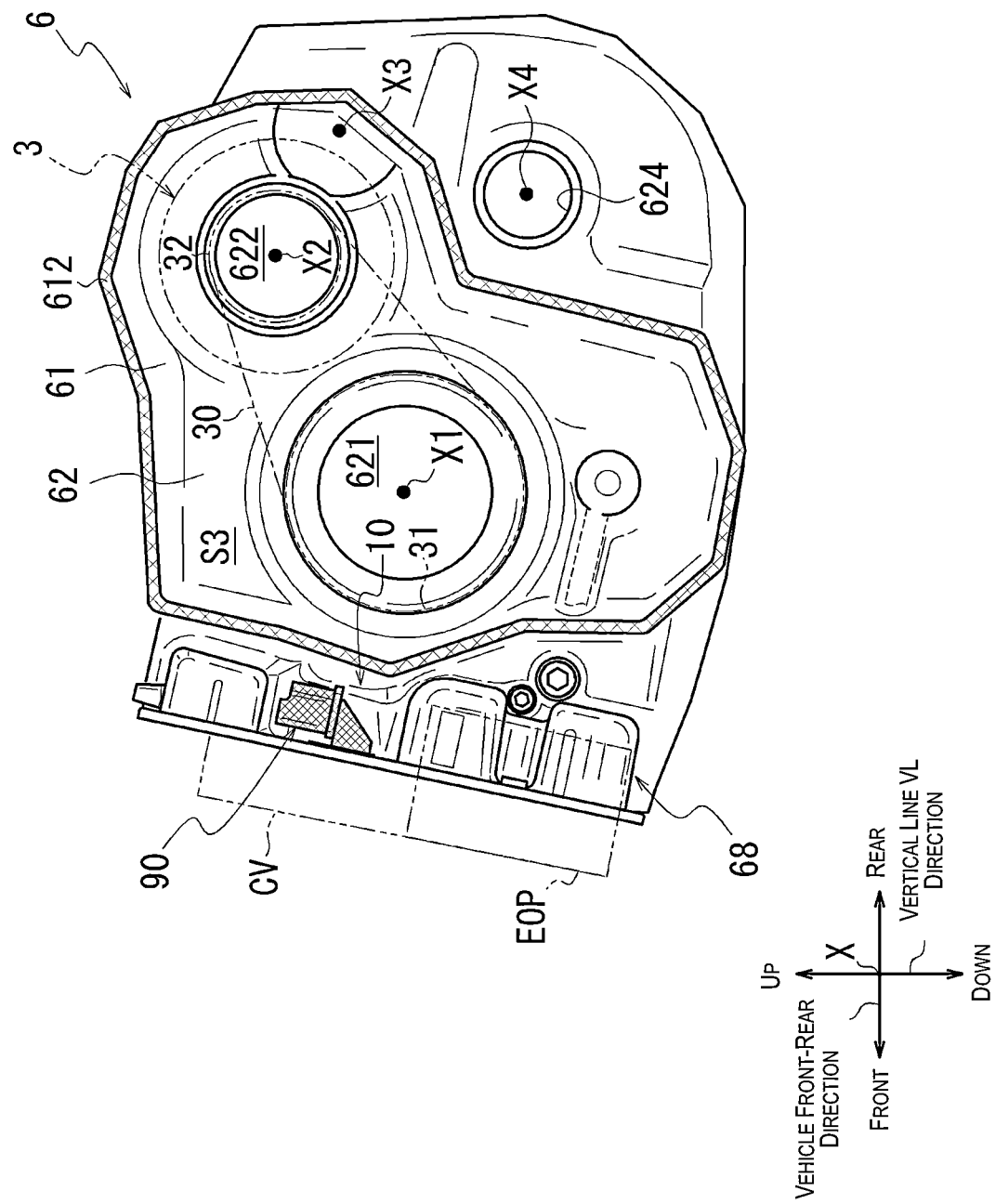
FIG. 2 is a schematic diagram of a case as viewed from the first cover side.

FIG. 2 is a plan view of the case 6 as viewed from the side of the first cover 7. In FIG. 2, to clarify the placement of the power connector 90 located within the aforementioned first recess 10, crosshatching is applied to the power connector 90.

As shown in FIG. 2, the case 6 has a cylindrical circumferential wall section 61 and a partition section 62.

The circumferential wall section 61 is provided in the direction along the axis of rotation X of the power transmission device 1, forming the outer wall of the power transmission device. The partition section 62 is provided within the circumferential wall section 61, across the range that crosses the axes of rotation (axes of rotation X1 to X4) of the power transmission device 1.

As shown in FIG. 1, the partition section 62 divides the space inside the circumferential wall section 61 in two along the direction of the axis of rotation X1. One side of the partition section 62 in the direction of the axis of rotation X1 is the first chamber S1, and the other side is the third chamber S3.

The case 6 and the second cover 8 are connected by bolts, not shown, to join the joining sections 611, 811 together. This maintains the opening of the case 6 sealed by the second cover 8, forming the closed first chamber S1.

The first chamber S1 houses the forward-reverse switching mechanism 2, the reduction mechanism 4, and the differential device 5.

The case 6 and the first cover 7 are connected by bolts, not shown, to join the joining sections 612, 711 together. This maintains the other opening of the case 6 sealed by the first cover 7, forming the closed third chamber S3. The third chamber S3 houses the variator 3.

As shown in FIG. 2, as viewed from the side of the first cover 7, the case 6 has through-holes 621, 622 opening on the inside of the circumferential wall section 61. The through-hole 624 opens on the outside of the circumferential wall section 61.

The through-hole 621 is formed centered on the axis of rotation X1. The input shaft 34 of the primary pulley 31 (see FIG. 1) penetrates the through-hole 621.

The through-hole 622 is formed centered on the axis of rotation X2. The output shaft 33 of the secondary pulley 32 (see FIG. 1) penetrates the through-hole 622.

The through-hole 624 is formed centered on the axis of rotation X4. The drive shaft 55A (see FIG. 1) penetrates the through-hole 624.

The primary pulley 31 is located below and toward the front of the vehicle relative to the secondary pulley 32. Therefore, the part of the circumferential wall section 61 that surrounds the outer circumference of the primary pulley 31 is positioned farther toward the front of the vehicle. The region of the circumferential wall section 61 below the primary pulley 31 is recessed downwardly and toward the rear of the vehicle.

Figure 4:
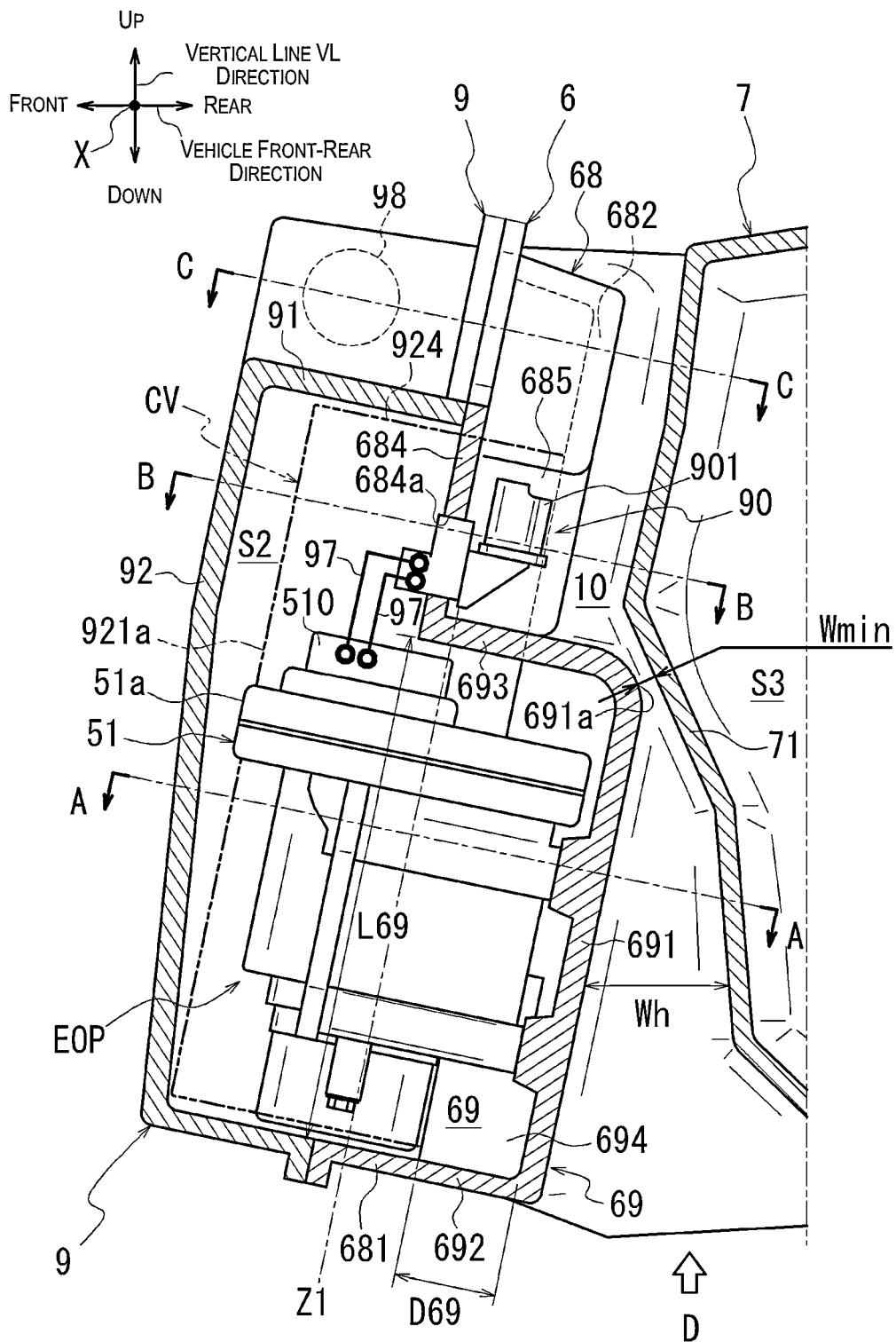
FIG. 4 is a cross-sectional diagram of essential parts of the housing.

Further, the first cover 7, which is assembled to the case 6 from the side of the viewer, also has a circumferential wall section 71 that is assembled from the direction of the axis of rotation X to the circumferential wall section 61 (see FIG. 4). As viewed from the direction of the axis of rotation X, the circumferential wall section 71 is formed in a shape that aligns with the circumferential wall section 61.

As shown in FIG. 2, the case 6 has a housing section 68 attached to the side surface on the front of the vehicle. The housing section 68 is provided with an opening facing the front of the vehicle.

Figure 3:
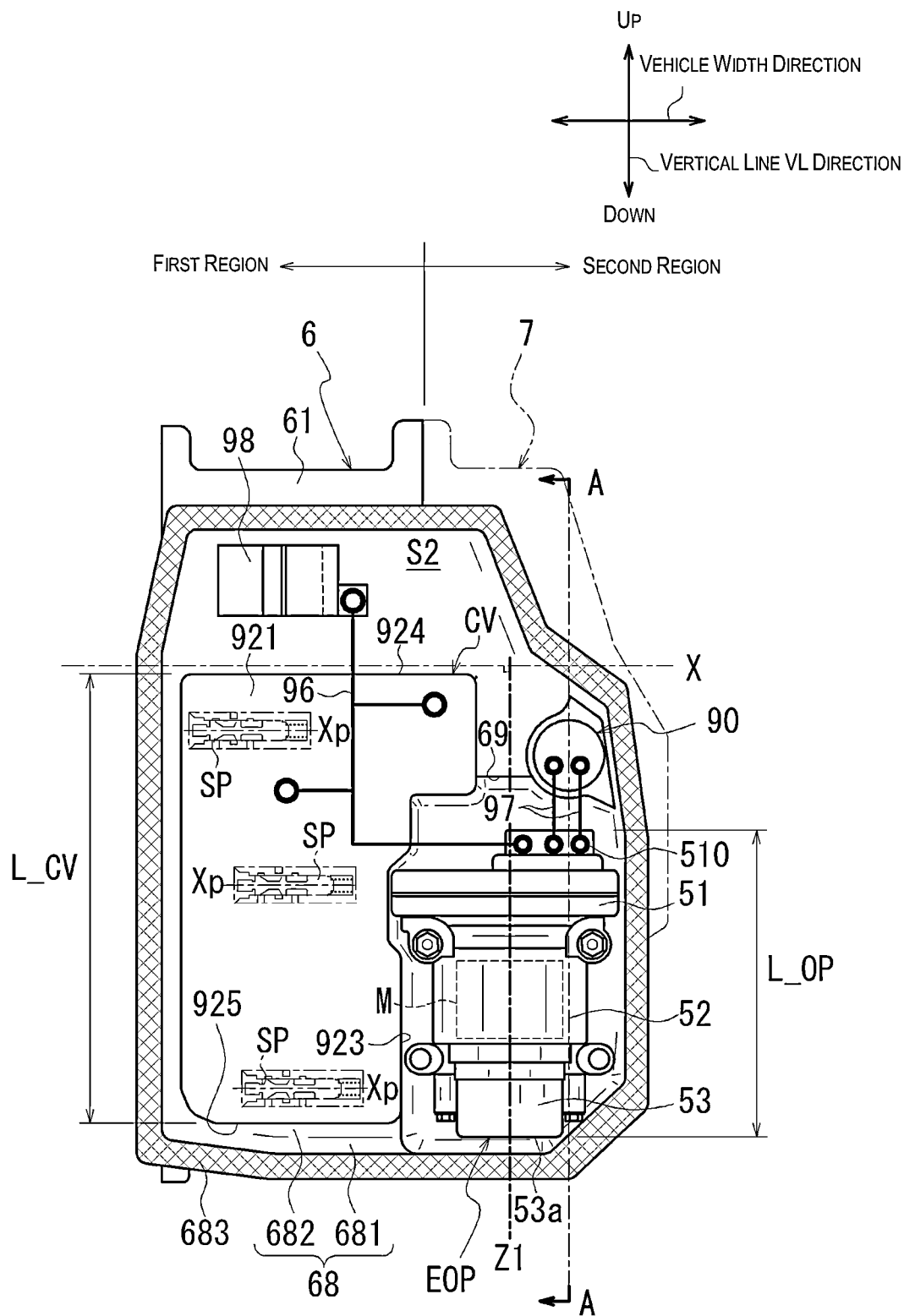
FIG. 3 is a schematic diagram of the housing section as viewed from the front of the vehicle.

FIG. 3 shows the housing section 68 as viewed from the front of the vehicle. In FIG. 3, the second chamber S2, as viewed from the front of the vehicle, is schematically shown along with other components of the housing HS (the case 6 and the first cover 7). Further, crosshatching is applied to the region of the joining section 683 located toward the viewer to clarify the location thereof. The appearance of the control valve CV is shown schematically.

The power supply line 97 connecting the electric oil pump EOP and the power connector 90, and the signal line 96 connecting the control connector 98 with the control valve CV and the electric oil pump EOP, are shown schematically.

As shown in FIG. 3, as viewed from the front of the vehicle, the housing section 68 has a wall section 682 and a circumferential wall section 681 that surrounds the entire outer circumference of the wall section 682. The end surface of the circumferential wall section 681 on the side toward the viewer serves as the joining section 683 with the third cover 9.

As shown in FIG. 1, the joining section 683 is joined all around with the joining section 911 on the side of the third cover 9. The housing section 68 and the third cover 9 are connected by bolts, not shown, to join the joining sections 683, 911 together. This forms the closed second chamber S2. The second chamber S2 houses the control valve CV and the electric oil pump EOP.

As shown in FIG. 3, the wall section 682 of the housing section 68 is provided in the direction along the axis of rotation X of the power transmission device 1. The housing section 68 is formed having a range in the direction of the axis of rotation X (left-right direction in the figure) from the region adjacent to the circumferential wall section 61 of the case 6 to the side of the first cover 7.

As shown in FIG. 1, a region of approximately half of the wall section 682 of the housing section 68 on the side of the second cover 8 (right side of the figure) (the first region) is integrated with the circumferential wall section 61 on the side of the case 6. A region of approximately half on the side of the first cover 7 (the second region) is provided with a gap from the outer circumference of the first cover 7 on the vehicle front side of the first cover 7.

As shown in FIG. 1, the control valve CV has a basic configuration with a separation plate 920 sandwiched between valve bodies 921, 921. Inside the control valve CV, an oil pressure control circuit (not shown) is formed. The oil pressure control circuit is equipped with pressure regulating valves (spool valves SP) that operate based on a solenoid driven by commands from a control device (not shown) and the signal pressure generated by the solenoid.

As shown in FIG. 3, inside the second chamber S2, the control valve CV is arranged upright with the stacking direction of the valve bodies 921, 921 aligned in the vehicle front-rear direction (the direction toward and away from the viewer).

In the second chamber S2, the control valve CV is arranged upright to satisfy the following conditions: (a) a plurality of spool valves SP inside the control valve CV are aligned in the vertical line VL direction (vertical direction) based on the installation state of the power transmission device 1 in the vehicle V, and (b) the direction of advancement and retraction Xp of the spool valves SP is aligned with the horizontal line direction.

This positions the direction of advancement and retraction of the spool valves within the control valve along the horizontal line direction. Further, the spool valves within the control valve are staggered in the vertical line VL direction. Thus, the advancement and retraction of the spool valves is not hindered while the second chamber S2 is prevented from becoming larger in the vehicle front-rear direction.

As viewed from the front of the vehicle, the control valve CV forms an approximate L-shape provided with a cut-out 923 in the essentially rectangular valve body 921. The cutout 923 is provided to avoid interference with the electric oil pump EOP.

As viewed from the front of the vehicle, part of the electric oil pump EOP is housed within the cutout 923 on the side of the second cover 8 (left side of the figure).

Here, a length L_CV of the control valve CV in the vertical line VL direction is longer than a length L_OP of the electric oil pump EOP in the vertical line VL direction (L_CV>L_OP).

Therefore, as viewed from the vertical line VL direction, part of the electric oil pump EOP is positioned to overlap the control valve CV.

As shown in FIG. 3, within the second chamber S2, the control valve CV and the electric oil pump EOP are aligned in the direction of the axis of rotation X of the power transmission device 1 (left-right direction in the figure).

As viewed from the front of the vehicle, the control valve CV overlaps the case 6. As viewed from the front of the vehicle, the electric oil pump EOP overlaps the first cover 7.

The electric oil pump EOP has a basic configuration with a control unit 51, a motor unit 52, and a pump unit 53 aligned in series along the motor M's axis of rotation Z1.

The electric oil pump EOP is provided in an orientation in which the axis of rotation Z1 is orthogonal to the axis of rotation X of the power transmission device 1. In this state, the electric oil pump EOP is arranged upright with the pump unit 53 positioned on the lower side within the second chamber S2 and the control unit 51 positioned on the upper side within the second chamber S2.

FIG. 4 is a schematic diagram illustrating a cross section of the housing HS cut along line A-A in FIG. 3. FIG. 4 schematically illustrates the cross section of a bulging part 69 in the second chamber S2 along with the cross section of the circumferential wall section 71 of the first cover 7 located on the rear side of the vehicle.

Figure 5:
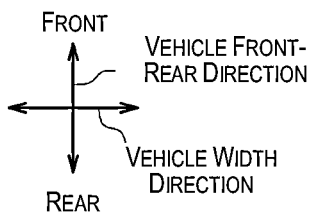
FIG. 5 is a cross-sectional diagram of essential parts of the housing.
Figure 5:
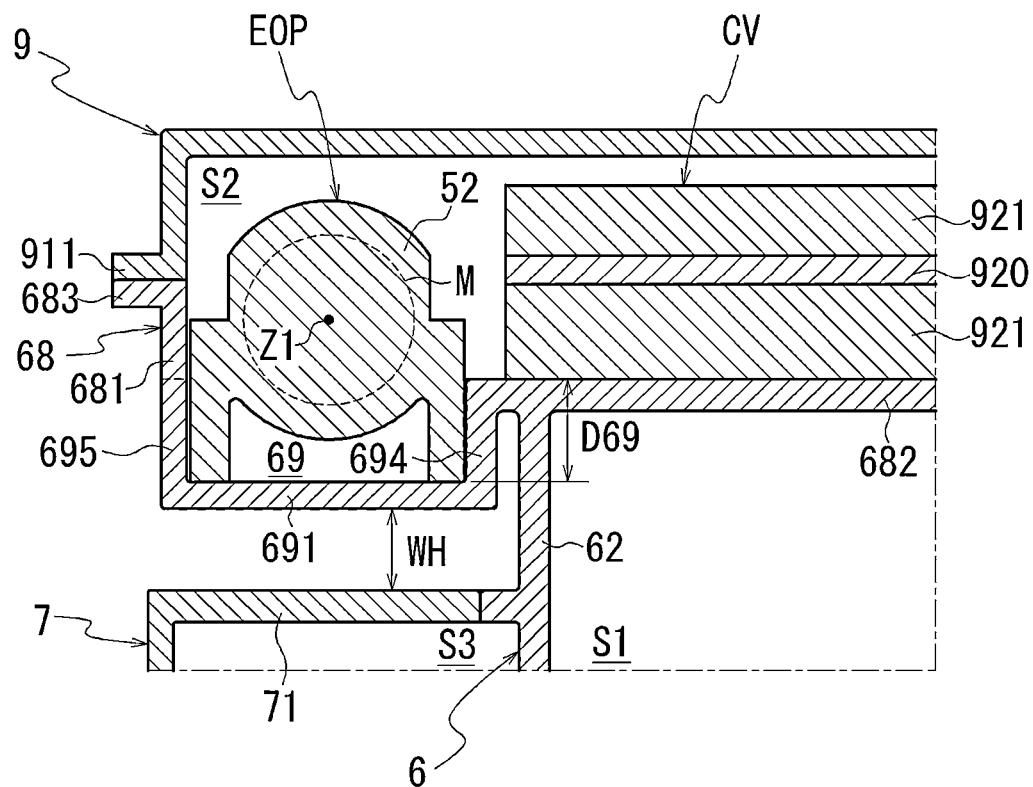

FIG. 5 is a schematic diagram illustrating a cross section of the housing HS cut along line A-A in FIG. 4. FIG. 5 schematically illustrates the cross section around the motor unit 52 of the electric oil pump EOP.

Figure 6:
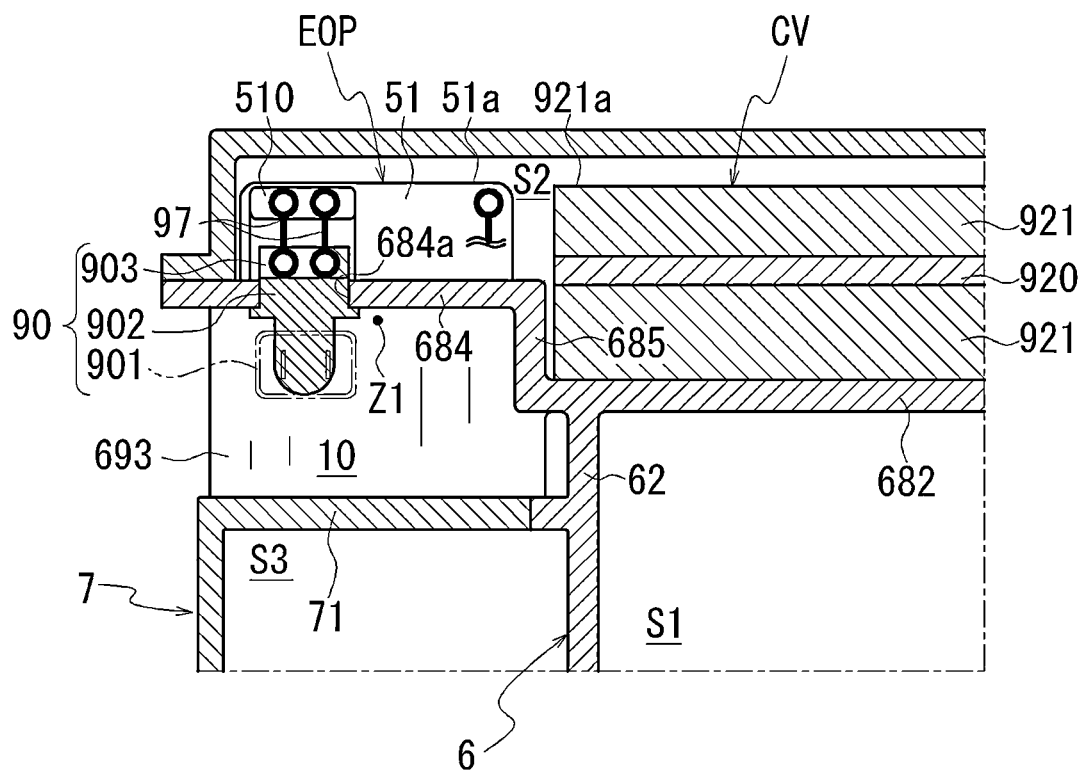
FIG. 6 is a cross-sectional diagram of essential parts of the housing.

FIG. 6 is a schematic diagram illustrating a cross section of the housing HS cut along line B-B in FIG. 4. FIG. 6 schematically illustrates the first recess 10 provided in the housing section 68 and the arrangement of the power connector 90 in the first recess 10.

Figure 7:
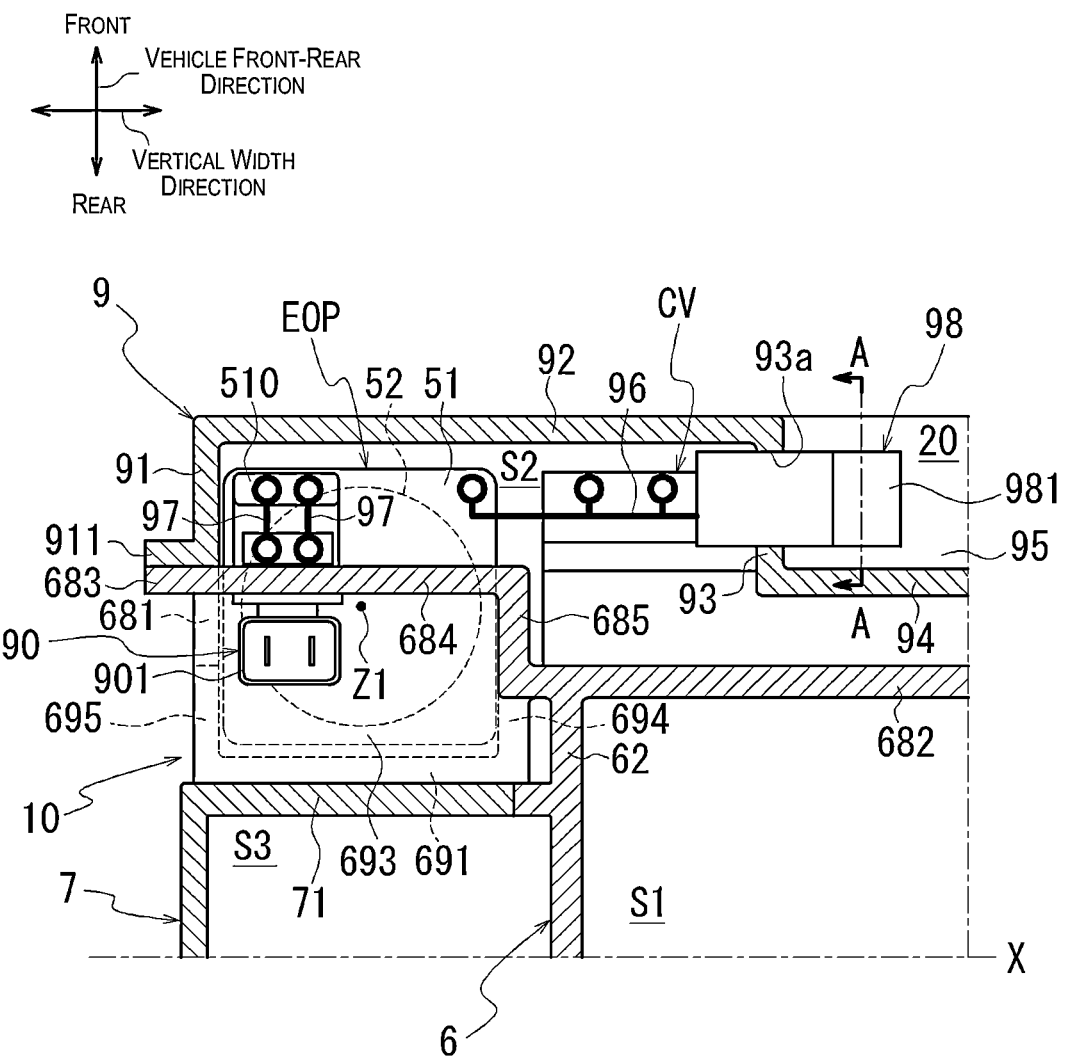
FIG. 7 is a cross-sectional diagram of essential parts of the housing.

FIG. 7 is a schematic diagram illustrating a cross section of the housing HS cut along line C-C in FIG. 4. FIG. 7 schematically illustrates the positional relationship between the first recess 10 provided in the housing section 68 and the second recess 20 provided in the third cover 9.

In FIG. 7, components hidden behind the upper wall section 693 of the first recess 10 away from the viewer (the bottom wall section 691, the side wall section 694, the side wall section 695, the motor unit 52) are indicated by dashed lines. This is to clarify the positional relationship of these components with the first recess 10.

Figure 8:
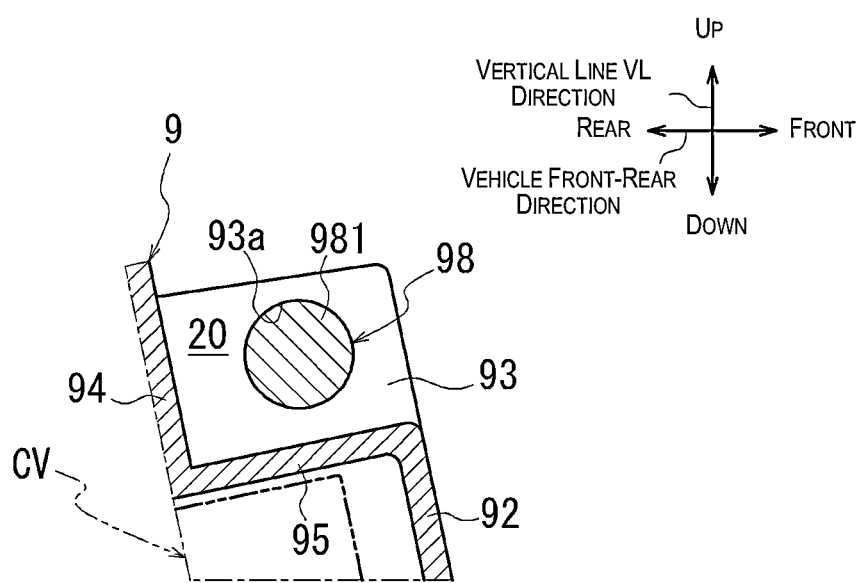
FIG. 8 is a cross-sectional diagram of essential parts of the housing.

FIG. 8 is a schematic diagram illustrating a cross section of the housing HS along line A-A in FIG. 7. FIG. 8 shows the region around the second recess 20 as viewed from the engine ENG side.

In FIGS. 3, 4, 6, and 7, a connection mode between the electric oil pump EOP and a power connector 90 via a power supply line 97, and a connection mode between a control connector 98 on one hand and the electric oil pump EOP and the control valve CV on the other via the signal line 96 are depicted in a simplified manner for the sake of convenience of explanation.

As shown in FIG. 3, in the wall section 682 of the housing section 68, as viewed from the front of the vehicle, there is a bulging part 69 that functions as the housing for the electric oil pump EOP, overlapping the region of the first cover 7.

As shown in FIGS. 4 and 5, the bulging part 69 is formed by bulging the wall section 682 toward the side of the first cover 7 (right side of FIG. 4). The bottom wall 691 of the bulging part 69 is positioned at a depth D69 away from the wall section 682 toward the side of the first cover 7.

In this embodiment, part of the electric oil pump EOP on the side of the first cover 7 is housed within the bulging part 69. By housing a part of the electric oil pump EOP within the bulging part 69, the side edge 51a of the electric oil pump EOP on the front side of the vehicle and the front side surface 921a of the control valve CV are approximately coplanar, positioning the electric oil pump EOP within the second chamber S2.

As shown in FIG. 4, the bulging part 69 is formed with a length L69 in the direction of the axis of rotation Z1 that can accommodate the electric oil pump EOP. The lower wall 692 of the bulging part 69 is located on the extension of the circumferential wall 681 of the housing section 68. The upper wall 693 of the bulging part 69 extends toward the front of the vehicle above the electric oil pump EOP. The upper wall 693 connects to the first wall section 684 of the housing section 68 farther toward the vehicle front than the axis of rotation Z1.

In the housing section 68, a first recess 10 is formed above the bulging part 69 in the direction of the axis of rotation Z1.

As shown in FIG. 7, the first recess 10 is a space formed by recessing part of the region overlapping the electric oil pump EOP in the direction of the axis of rotation Z1 downwards in the direction of the axis of rotation Z1 and toward the front of the vehicle (upper side of the figure).

That is, in the housing section 68, the region located above the electric oil pump EOP in the vertical line VL direction (vertical direction) along the axis of rotation Z1 of the electric oil pump EOP in the housing section 68 is recessed downwardly on the side of the electric oil pump EOP.

As viewed from the direction of the axis of rotation Z1, the first recess 10 is a space enclosed by the first wall section 684 and the second wall section 685 of the housing section 68 side, the partition section 62 of the case 6 side, and the circumferential wall section 71 of the first cover 7 side. Therefore, the first recess 10 is surrounded by the first chamber S1, the second chamber S2, and the third chamber S3 within the housing HS.

The upper wall 693 of the bulging part 69, which houses the electric oil pump EOP, is located away from the viewer the first recess 10 in the diagram (see FIG. 4).

Therefore, the first recess 10 is formed facing upwardly above the power transmission device 1. Further, the first recess 10 also opens toward one side in the vehicle width direction (left direction of FIG. 7). A power connector (power connector 90) is located within the first recess 10.

As shown in FIG. 6, the power connector 90 has a connection part 901 for connecting with a mating connector. The connection part 901 is provided in the first recess 10, facing upward for connection with the mating connector.

As viewed from above in the vertical line VL direction, the connection part 901 of the power connector 90 is positioned to completely overlap the first recess 10. Further, the connection part 901 is positioned to completely overlap the first recess 10, as viewed from the direction of the axis of rotation X of the power transmission device 1 (see FIG. 4). Therefore, the connection part 901 of the power connector 90 is provided without protruding outside the outer circumference of the housing HS (the third cover 9, the first cover 7, the housing section 68). That is, the connection part 901 is housed within the first recess 10, which is located inside the outer frame of the housing HS, without protruding outside the outer frame of the housing HS.

The lower part on the side away from the viewer of the connection part 901 is connected to the base 902 (see FIG. 6). The base 902 penetrates a mounting hole 684a provided in the first wall section 684. The region of the base 902 located within the second chamber S2 is connected to the connection part 903 with the power supply line 97. The power connector 90 is electrically connected to the control unit 51 (connection part 510) of the electric oil pump EOP via the power supply line 97.

As shown in FIG. 4, the mounting hole 684a in the first wall section 684 is positioned above the upper wall 693 of the bulging part 69.

Therefore, as shown in FIG. 3, the power connector 90 is positioned above the electric oil pump EOP.

In this embodiment, the length L_OP of the electric oil pump EOP in the vertical line VL direction is shorter than the length L_CV of the control valve CV in the vertical line VL direction (L_OP<L_CV). Therefore, within the second chamber S2, aligning the lower end 925 of the control valve CV with the lower end 53a of the electric oil pump EOP ensures that a usable space is secured above the electric oil pump EOP and to the side of the control valve CV.

In this embodiment, the power connector 90 is positioned in this usable space.

Here, the electric oil pump EOP is positioned with a connection part 510 to the power supply line 97 facing upwards in the vertical line VL direction. Therefore, directly below the power connector 90, the connection part 510 is positioned. Thus, the connection part 510 of the electric oil pump EOP and the power connector 90 can be electrically connected over the shortest distance. This allows for a shorter power supply line 97. Further, connecting the electric oil pump EOP to the power connector 90 after installation of the electric oil pump EOP in the second chamber S2 is facilitated.

As shown in FIG. 4, the first wall section 684 in which the power connector 90 is mounted extends upward along the axis of rotation Z1, overlapping the control valve CV as viewed from the vehicle width direction. In the first wall section 684, the circumferential wall section 91 of the third cover 9 abuts from the front side of the vehicle above the mounting hole 684a. In the cross section shown in FIG. 4, the first wall section 684 and the circumferential wall section 91 contact at a height above the upper edge 924 of the control valve CV.

As shown in FIG. 7, the first wall section 684 extends in the direction approaching the control valve CV (right direction of the figure) along the extension of the joining section 683 of the housing section 68. The first wall section 684 connects on one side of the control valve CV in the vehicle width direction with the second wall section 685. The second wall section 685 extends downward on the side of the first cover 7 (lower side of the figure) along the side edge of the control valve CV. The second wall section 685 connects to the wall section 682 on the front side of the vehicle.

As viewed from the direction of the axis of rotation Z1, the second wall section 685 is positioned to overlap the side wall section 694 of the bulging part 69. The opposite side wall section 695 of the bulging part 69 extends downward on the side of the first cover 7 (lower side of the figure) along the extension of the circumferential wall section 681 of the housing section 68.

As viewed from the direction of the axis of rotation Z1 in the housing section 68, the first wall section 684 and the second wall section 685 are recessed toward the front side of the vehicle relative to the wall section 682, based on the wall section 682 supporting the control valve CV. Providing the first wall section 684 and the second wall section 685 contributes to forming the first recess 10.

The circumferential wall section 71 of the first cover 7 is positioned on the vehicle rear side, as viewed from the first wall section 684.

The first recess 10 is formed between the first wall section 684 and the circumferential wall section 71 in the vehicle front-rear direction. The upper wall section 693 of the bulging part 69 mentioned above is located behind the first recess 10 in the diagram.

As shown in FIG. 4, the connection part 691a between the upper wall 693 and the bottom wall 691 forms an arcuate outer perimeter in the cross section viewed along the axis of rotation Z1. The connection part 691a reaches a position overlapping the circumferential wall section 71 of the first cover 7 in the vertical line VL direction. The gap between the housing section 68 and the circumferential wall section 71 is at a minimum width Wmin at the part of the connection part 691a.

The width of the gap Wh in the vehicle front-rear direction between the bottom wall 691 and the circumferential wall section 71 decreases with increasing height with respect to the vertical line VL direction. As viewed from below in the vertical line VL direction (see arrow D in the figure), the region of the bottom wall 691 on the side of the connection part 691a and the circumferential wall section 71 are positioned to overlap.

Therefore, even if foreign objects such as stones are kicked up during the operation of the vehicle V in which the power transmission device 1 is mounted and enter between the bottom wall 691 and the circumferential wall section 71, it is difficult for such foreign objects to reach the first recess 10 positioned above the bulging part 69.

The third cover 9, which covers the opening on the vehicle front side of the housing section 68, has a cover part 92 that covers the opening of the second chamber S2 and a circumferential wall section 91 that surrounds the entire outer circumference of the cover part 92.

As shown in FIG. 7, the third cover 9 has a second recess 20 formed in the region above the control valve CV in the direction of the axis of rotation Z1.

As viewed from the direction of the axis of rotation Z1, the second recess 20 is a space formed by recessing part of the region overlapping the control valve CV in the third cover 9 downward and toward the rear side of the vehicle in the direction of the axis of rotation Z1.

The second recess 20 is located on the vehicle front side of the engine ENG (see FIG. 1) as viewed from the first recess 10. As shown in FIG. 7, the second recess 20 and the first recess 10 are positioned staggered in the direction of the axis of rotation X (left-right direction in the diagram) and the vehicle front-rear direction (up-down direction in the diagram) of the power transmission device 1.

As shown in FIGS. 7 and 8, as viewed from the direction of the axis of rotation Z1, the second recess 20 is formed between a first wall section 93 extending in the vehicle front-rear direction, a second wall section 94 extending in the vehicle width direction, and a bottom wall section 95 spanning the first wall section 93 and the second wall section 94.

Therefore, the second recess 20 opens toward the vehicle front side and the engine ENG side in the vehicle width direction (right side of FIG. 7).

A through-hole 93a is provided in the first wall section 93. The through-hole 93a is positioned facing the engine ENG side. A control connector (control connector 98) is inserted from the engine ENG side (right side of FIG. 7) into the through-hole 93a.

The control connector 98 positions a connection part 981 for the control signal wiring inside the second recess 20 on the outside of the third cover 9. As viewed from above in the vertical line VL direction, the control connector 98 is positioned with the connection part 981 facing the engine ENG side, opposite the electric oil pump EOP.

As viewed from above in the vertical line VL direction, the connection part 981 of the control connector 98 is positioned to completely overlap the second recess 20. Further, the connection part 981 is positioned to completely overlap the second recess 20, as viewed from the engine ENG side (see FIG. 8). Therefore, the connection part 981 of the control connector 98 is provided without projecting beyond the outer circumference of the housing HS (third cover 9).

The region of the control connector 98 located within the second chamber S2 is connected to the signal line 96. The signal line 96 is connected to the control valve CV and the electric oil pump EOP (see FIG. 3). Thus, the control valve CV and the electric oil pump EOP operate based on the control signals input through the signal line 96.

Thus, in the power transmission device 1 according to this embodiment, the connection part 901 of the power connector 90 is positioned to completely overlap the first recess 10, as viewed from the vertical line VL direction (see FIG. 7). Further, the connection part 901 is positioned to completely overlap the first recess 10, as viewed from the direction of the axis of rotation X of the power transmission device 1 (see FIG. 4).

Therefore, the connection part 901 of the power connector 90 is positioned within the first recess 10 without projecting beyond the outer circumference of the housing HS, with the connection port facing upward.

This allows the power supply line to be connected to the connection part 901 from above the power transmission device 1.

Further, in the power transmission device 1, the connection part 981 of the control connector 98 is positioned to completely overlap the second recess 20, as viewed from the vertical line VL direction (see FIG. 7). The connection part 981 is positioned to completely overlap the second recess 20, as viewed from the engine ENG side (see FIG. 8).

Therefore, the connection part 981 of the control connector 98 is positioned within the second recess 20 without projecting beyond the outer circumference of the housing HS, with the connection port facing the engine ENG side.

This allows the control signal wiring to be connected to the connection part 981 of the control connector 98 from the engine ENG side adjacent to the power transmission device 1.

As described above, the power transmission device 1 in this embodiment has the following configuration.

(1) The power transmission device 1 has
the power transmission mechanism (the torque converter T/C, the forward-reverse switching mechanism 2, the variator 3, the reduction mechanism 4, and the differential device 5) that transmits driving force from the engine ENG (drive source) to the drive wheels WH, WH, the housing HS (case) that houses the power transmission mechanism, the control valve CV that controls the oil pressure supplied to the power transmission mechanism, and the electric oil pump EOP (electric pump) that supplies oil to the control valve CV.

The housing HS has the first chamber S1 that houses the power transmission mechanism, and the second chamber S2 that is adjacent to the first chamber S1.

The control valve CV and the electric oil pump EOP are arranged upright within the second chamber S2.

In the housing section 68 of the housing HS, a first recess 10 is provided in the region overlapping the electric oil pump EOP, as viewed from above along the axis of rotation Z1 of the electric oil pump EOP, recessed toward the electric oil pump EOP from above.

The power connector 90 of the electric oil pump EOP is arranged in the first recess 10 with a connection part 901 (connector) facing upwards.

The connection part 901 of the power connector 90 is connected to a power supply line extending from the power source, supplying driving power to the motor M of the electric oil pump EOP. Positioning the connection part 901 of the power connector 90 within the first recess 10 prevents the connection part 901 from projecting beyond the outer circumference of the housing HS.

If there are parts that project beyond the outer circumference of the housing HS, it is necessary to secure space in the vehicle V in which the power transmission device 1 is mounted to avoid interference with the projecting parts. This space is separate from the space required for installing the housing HS of the power transmission device 1, and it is preferable not to use the limited space in the vehicle V for the connection part 901 of the power connector 90.

As described above, as viewed from the direction of the axis of rotation Z1, the region overlapping the electric oil pump EOP in the vertical line VL direction in the housing section 68, which is located above the electric oil pump EOP, is recessed downward toward the side of the electric oil pump EOP to form the first recess 10. The connection part 901 of the power connector 90 is positioned within the first recess 10 facing upward.

Thus, since the first recess 10 is a space formed by recessing a part of the housing HS, the connection part 901 can be provided without significantly projecting beyond the housing HS.

This allows the electric oil pump EOP to be powered without requiring additional limited space on the vehicle V side, optimizing the placement of the power connector 90.

(2) The electric oil pump EOP and the control valve CV are aligned in the direction of the axis of rotation X within the second chamber S2.

With this configuration, the thickness of the second chamber S2 in the radial direction (vehicle front-rear direction) of the axis of rotation X of the power transmission device 1 can be reduced, preventing the power transmission device 1 from increasing in size in the vehicle front-rear direction. Mounting the power transmission device 1 in the vehicle V with the second chamber S2 oriented horizontally suitably prevents the power transmission device 1 from increasing in size horizontally.

(3) A length L_OP of the electric oil pump EOP in the vertical line VL direction (vertical direction) is shorter than a length L_CV of the control valve CV in the vertical line VL direction (L_OP<L_CV).

By arranging the lower end 53a of the electric oil pump EOP and the lower end 925 of the control valve CV at the same height, a space can be secured above the electric oil pump EOP and to the side of the control valve CV for positioning the power connector 90.

This allows for easy access to the connection part 901 when the connection part 901 of the power connector 90 is positioned upward in the vertical line VL direction (vertical direction), based on the installation state of the power transmission device 1 in the vehicle V. Therefore, after the power transmission device 1 is installed in the vehicle V, the power supply line extending from the vehicle V side can be easily connected to the connection part 901.

(4) In the housing HS, the second recess 20 is provided in the region overlapping the control valve CV, as viewed from the direction of the axis of rotation Z1 of the electric oil pump EOP.

As viewed from the front side of the vehicle, within the second recess 20, the control connector 98 of the electric oil pump EOP is positioned with the connection part 981 facing the opposite side of the electric oil pump EOP.

The power connector 90 placed within the first recess 10 is a connector for supplying power to the electric oil pump EOP.

With this configuration, the control connector 98 can be provided without causing the connection part 981 to project beyond the outer circumference of the housing HS. This allows for the connection of control signal wiring without requiring the use of the limited space on the vehicle V side, thereby optimizing the placement of the control connector 98.

(5) The first recess 10 and the second recess 20 are positioned staggered in the direction of the axis of rotation X of the power transmission device 1.

With this configuration, the connection part 981 of the control connector 98 is positioned to overlap the second chamber S2 in both the direction of the axis of rotation X of the power transmission device 1 and the direction of the axis of rotation Z1 of the electric oil pump EOP. This optimizes the placement of the power connector 90 and the control connector 98.

Moreover, the control signal wiring is connected to the connection part 981 of the control connector 98 from the direction of the axis of rotation X of the power transmission device 1. In the vehicle equipped with the power transmission device 1, the drive source and the power transmission device 1 are adjacent in the direction of the axis of rotation X of the power transmission device 1. Therefore, positioning the connection part 981 of the control connector 98 toward the drive source side allows for bundling the control signal wiring for the drive source and the control signal wiring connected to the connection part 981 of the control connector 98, simplifying the routing of control signal wiring in the vehicle.

(6) The housing section 68 of the housing HS includes the circumferential wall section 681 that surrounds the outer circumference of the second chamber S2, and the third cover 9 (cover part) that seals the opening of the circumferential wall section 681.

The first recess 10 is provided in the circumferential wall section 681, and the second recess 20 is provided in the third cover 9.

The signal line 96 extending from the control connector 98 is connected to the control valve CV and the electric oil pump EOP after the control valve CV and the electric oil pump EOP are installed within the housing section 68.

If the control connector 98 is provided on the side of the circumferential wall section 681, connecting the signal line 96 to the control valve CV and the electric oil pump EOP can become complex.

Before the opening of the circumferential wall section 681 is sealed by the third cover 9, the control valve CV and the electric oil pump EOP to which the signal line 96 is connected are arranged aligned in the direction of the axis of rotation X of the power transmission device 1 inside the circumferential wall section 681.

If the control connector 98 is provided on the third cover 9, when the opening of the circumferential wall section 681 is sealed by the third cover 9, the signal line of the control connector 98 supported by the third cover 9 can easily be connected to the control valve CV and the electric oil pump EOP.

This simplifies connection work between the signal line 96 and the control valve CV and the electric oil pump EOP. By preparing the third cover 9 with the control connector 98 assembled, and assembling the prepared third cover 9 to the circumferential wall section 681, installation of the control connector 98 is completed. This makes installation of the control connector 98 easier.

(7) The housing HS has the partition section 62 (support wall) that supports the axes of rotation X1 to X4 of the power transmission mechanism, and the wall section 682 (partition wall) that divides the first chamber S1 and the second chamber S2 on one side of the partition section 62.

The wall section 682 extends to the side of the third chamber S3 on the other side of the partition section 62.

As viewed from the radial direction of the axes of rotation X1 to X4, the region of the wall section 682 (partition wall) overlapping the first chamber S1 is the first region where the control valve CV is mounted, and the region overlapping the third chamber S3 is the second region where the electric oil pump EOP is mounted (see FIG. 3). A mounting hole 684*a* for the power connector 90 placed within the first recess 10 is formed above the second region.

With this configuration, as shown in FIG. 6, the first recess 10 is positioned within the housing HS at the top, surrounded by the first chamber S1, the second chamber S2, and the third chamber S3.

The second chamber S2 communicates with the first recess 10 via the mounting hole 684*a*. By providing the power connector 90 using the mounting hole 684*a*, the electric oil pump EOP and the power connector 90 can be connected over the shortest distance.

(8) As viewed from the radial direction of the axis X of the power transmission device 1, the region of the second region overlapping the electric oil pump EOP is the bulging part 69 that bulges toward the third chamber S3 side.

The upper side of the bulging part 69 forms the first recess 10.

With this configuration, as shown in FIG. 4, the second chamber S2 can suitably prevent an increase in size toward the front side of the vehicle, which is the outer side in the radial direction of the axis X of the power transmission device 1.

(9) As viewed from the direction of the axis of rotation Z1 of the electric oil pump EOP, the bulging part 69 bulges up to the position overlapping the third chamber S3.

As shown in FIG. 4, at the bottom of the power transmission device 1, the bottom wall 691 of the bulging part 69 and the circumferential wall section 71 surrounding the third chamber S3 are provided with a gap WH in the vehicle front-rear direction, and there is a gap between the bulging part 69 and the circumferential wall section 71. This gap continues from the lower end of the power transmission device 1 to the first recess 10.

If the gap is formed in a straight line, during the operation of the vehicle V equipped with the power transmission device 1, foreign matter such as kicked up stones could potentially reach the first recess 10 through the gap.

As shown in FIG. 4, viewed from the direction of the axis of rotation Z1 (direction of arrow D in the diagram), the bottom wall 691 of the bulging part 69 and the circumferential wall section 71 surrounding the third chamber S3 are positioned to overlap, so that the region between the bulging part 69 and the circumferential wall section 71 functions as a labyrinth seal. Thus, during the operation of the vehicle V equipped with the power transmission device 1, it becomes difficult for foreign matter such as kicked up stones to reach the first recess 10.

This protects the connection part 901 of the power connector 90 from impact from foreign matter and other objects.

In the foregoing embodiment, a case was illustrated in which the power transmission device 1 transmits rotation of the engine ENG to the drive wheels WH, WH, but it is also possible for the power transmission device 1 to transmit the rotation of at least either the engine ENG or the motor (rotary electric motor) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) and not have a shifting function. If the power transmission device does not have a shifting function and instead reduces and transmits rotation of the motor to the drive wheels WH, WH, the oil pressure control circuit for supplying the oil OL for cooling the motor and the oil OL for lubricating the reduction mechanism can be arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited only to those aspects shown in the embodiments. The present invention may be modified as deemed appropriate within the scope of the technical concept of the invention.

EXPLANATION OF THE REFERENCE SYMBOLS

1 Power transmission device; 2 Forward-reverse switching mechanism (power transmission mechanism); 3 Variator (power transmission mechanism); 4 Reduction mechanism (power transmission mechanism); 5 Differential device (power transmission mechanism); 6 Case; 7 First cover (cover part); 71 Circumferential wall section; 9 Third cover (cover part); 10 First recess; 20 Second recess; 62 Partition section (support wall); 68 Housing section; 681 Circumferential wall section; 682 Wall section (partition wall); 684a Mounting hole; 69 Bulging part; 691 Bottom wall section; 90 Power connector (connector); 901 Connection part; 94 Signal line; 98 Control connector; 981 Connection part; HS Housing (case); CV Control valve; EOP Electric oil pump (electric pump); S1 First chamber; S2 Second chamber; S3 Third chamber; and X, X1-X4, Z1 Axes of rotation.

The invention claimed is:

1. A power transmission device, comprising:
a case that houses a power transmission mechanism;
a control valve configured to control an oil pressure supplied to the power transmission mechanism; and
an electric pump configured to supply oil to the control valve, wherein
the case has a first chamber that houses the power transmission mechanism, and a second chamber that is arranged adjacent to the first chamber,
the control valve and the electric pump are arranged upright in the second chamber,
in the case, a first recess that is recessed from above the electric pump toward the electric pump is formed in a region that overlaps the electric pump, as viewed from above along an axis of rotation of the electric pump, and
a connector of the electric pump is arranged such that a connection part with a mating connector faces up in the first recess.

2. The power transmission device according to claim 1, wherein
the electric pump and the control valve are arranged in a direction of an axis of rotation of the power transmission device in the second chamber.

3. The power transmission device according to claim 2, wherein
the electric pump has a vertical length that is shorter than a vertical length of the control valve.

4. The power transmission device according to claim 2, wherein
in the case, a second recess is provided in a region overlapping the control valve, as viewed from a direction of the axis of rotation of the electric pump,
in the second recess, a control connector of the electric pump is disposed so that a connection part with a mating connector faces a side opposite the electric pump, and
the connector arranged in the first recess is a power supply connector for the electric pump.

5. The power transmission device according to claim 4, wherein
the first recess and the second recess are provided staggered in the direction of the axis of rotation of the power transmission device.

6. The power transmission device according to claim 4, wherein
the case has
a circumferential wall section that surrounds an outer circumference of the second chamber, and
a cover section that seals an opening in the circumferential wall section, and
the first recess is provided in the circumferential wall section, and the second recess is provided in the cover section.

7. The power transmission device according to claim 1, wherein
the case has
a support wall that supports an axis of rotation of the power transmission mechanism, and
a partition wall that partitions the first chamber and the second chamber on one side of the support wall,
the partition wall extends from the other side of the support wall to a side of a third chamber, and
as viewed from a radial direction of the axis of rotation of the power transmission mechanism, in the partition wall, a region that overlaps the first chamber is a first region to which the control valve is attached, a region that overlaps the third chamber is a second region to which the electric pump is attached, and an attachment hole for the connector arranged inside the first recess is open in a top section of the second region.

8. The power transmission device according to claim 7, wherein
as viewed from the radial direction of the axis of rotation of the power transmission mechanism, in the second region, a region that overlaps the electric pump constitutes a bulging part that bulges toward the third chamber, and a top of the bulging part is the first recess.

9. The power transmission device according to claim 8, wherein
as viewed from the direction of the axis of rotation of the electric pump, the bulging part bulges up to a position that overlaps the third chamber.

* * * * *